: 2,703,844
Patented Mar. 8, 1955

2,703,844

INFRARED GAS ANALYZER

Elmer C. Miller, Bartlesville, Okla., assignor to Phillips Petroleum Company, a corporation of Delaware Application February 5, 1951, Serial No. 209,449

5 Claims. (Cl. 250—43.5)

This invention relates to a method of and apparatus for analyzing gases by the use of infra-red radiation. In another aspect it relates to optical systems for transmitting radiation through gas chambers. In a further aspect it relates to a method for detecting the presence of small quantities of gas by means of infra-red radiation absorption. In a still further aspect it relates to filtering systems for infra-red radiation analysis.

It is well known in the art to employ the principle of absorption of infra-red radiation in a gas mixture as a basis for qualitative analysis of said mixture, and in particular for the determination of the presence of a particular constituent in the mixture. This method is based upon the property of various gases to selectively absorb certain wave lengths of infra-red radiation when such radiation is transmitted through said gases. In known methods of gas detection employing this principle, two beams of radiation from a single infra-red source are compared by means of two bolometers forming arms of a Wheatstone bridge. A chamber containing the substance to be tested is inserted in one beam and the radiation absorbed by said gases is thus indicated by an unbalancing of the Wheatstone bridge. While an arrangement of this sort presents a simple analysis system convenient to use and which will give a rapid indication of a particular gas, it is not satisfactory for the majority of industrial gas analysis problems since other constituents present in the mixing being analyzed will often have absorption bands of their own overlapping those wave lengths emitted by the common source and detected by the bolometers. A partial solution of this difficulty resides in the limitation of the radiation transmitted, by the use of appropriate filters, to those wave lengths not absorbed by any of the other constituents in the mixture being analyzed. However, in other situations, the absorption bands of the particular gas under analysis and of other constituents in the mixture appear at wave lengths so close to one another that auxiliary means must be provided to eliminate the effects of the undesired adsorption bands in order to give a true indication of the presence of a particular gas. It is with the solution of this latter problem that the present invention is primarily concerned.

The second problem that often presents itself in infrared gas analysis is the difficulty of obtaining a signal on the measuring device of sufficient strength to give accurate readings. This is particularly true when the gas being detected appears in low concentrations or because of rather weak absorption bands associated with said gas. To overcome these difficulties, the present invention has provided optical paths whereby the radiation beam or beams are reflected through the analysis chamber a plurality of times thereby increasing the magnitude of whatever adsorption that may take place within said chamber.

An object of this invention is to provide apparatus for detecting gases which is simple in construction, responsive to small changes of concentration, fast in operation, and reliable in result.

Another object is to provide apparatus for detecting the presence of a given gas in a gaseous mixture by means of infra-red analysis.

A further object is to provide means for accurately detecting small quantities of gases.

A still further object is to provide filtering means for compensating the effects of undesired adsorption bands found in infra-red gas analyzers.

These and other objects, advantages, and features of the present invention will become apparent from the following detailed description taken in conjunction with the accompanying drawings illustrating a preferred embodiment of the invention in which.

Figure 1:
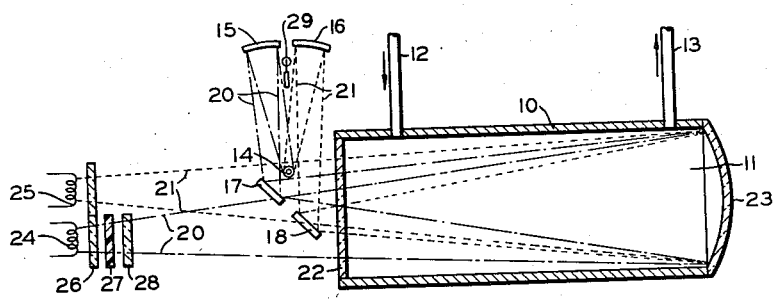
Figure 1 shows a diagrammatic view of the analyzer employed in this invention.

Referring now to the drawings in detail and to Figure 1 in particular, there is shown a chamber 10 having an interior 11 through which the gas mixture to be analyzed is circulated by means of inlet conduit 12 and outlet conduit 13. The source of infra-red radiation 14 which may be any well known emitter such as, for example, a heated coil of Nichrome wire, is positioned outside chamber 11 so that portions of said radiation will strike suitable concave reflectors 15 and 16. Reflectors 15 and 16 focus radiation beams 20 and 21 respectively, on plane reflectors 17 and 18, respectively, which in turn reflect both beams through window 22 of chamber 10 and through the gas occupying interior 11 so as to strike concave reflector 23. Reflector 23 in turn reflects beams 20 and 21 back through chamber 10, window 22 and filter 26 to strike bolometric resistors 24 and 25, respectively. In addition, filters 27 and 28 are inserted in the path of beam 20 in order to absorb certain selected wave lengths as hereinafter described in detail. There is also inserted between source 14 and reflectors 15 and 16 a trimmer 29 which consists of a small opaque disk which may be selectively inserted in either beam 20 or beam 21 as may be required in the operation of this analyzer.

Figure 3:
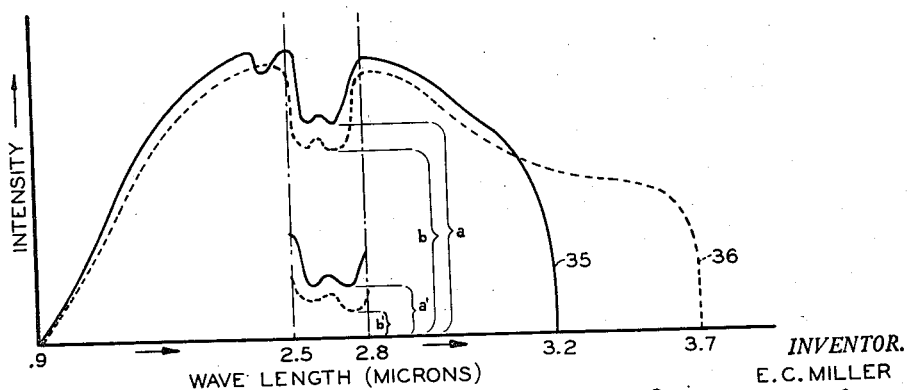
Figure 3 is a graphical representation of the intensity of radiation at various wave lengths of the filtered beams shown in Figure 1.

In order to describe the operation of the analyzer of Figure 1, reference is made to the graph of Figure 3 which shows the relative intensity of radiation transmitted at given wave lengths through the various filtering devices and through a blank composition being tested that contains some water and/or carbon dioxide, but no methane (Figure 3 is not drawn to scale). For purposes of illustration let it be assumed that the analyzer is being used to detect small concentrations of methane. Let it further be assumed that varying amounts of both carbon dioxide and water vapor are present in the mixture to be analyzed and when small amounts are present the curves between 2.5 and 2.8 microns have elevation $a$, $b$, and when large amounts are present $a'$, $b'$.

The radiation emitted from source 14 contains all the frequencies in the infra-red spectrum. If chamber 10 is empty, both beams 21 and 20 will twice pass through window 22 and interior 11 of said chamber 10. Assuming window 22 is constructed of fused quartz, all the radiation of wave lengths longer than approximately 3.7 microns will be absorbed and radiation of shorter wave lengths having an intensity represented by the region below curve 36 of Figure 3 will be transmitted through said window, and will in the absence of other filters strike both bolometric resistors 24 and 25, which form arms of the Wheatstone bridge circuit (not shown), changing their resistances by equal amounts. For the region between 2.5 and 2.8 microns there will be a slight dip in the curve but not as pronounced as when some water vapor and/or carbon dioxide is present, as illustrated.

Since it is known that methane absorbs infra-red radiation at a wave length of approximately 3.4 microns a filter 27 of material such as polyethylene is inserted in beam 20. Polyethylene absorbs all radiation of interest having a wave length longer than approximately 3.2 microns, its transmission curve being illustrated by curve 35 of Figure 3. With regard to the region between 2.5 and 2.8 microns the explanation concerning curve 36 is applicable in like manner. The Wheatstone bridge circuit is then balanced to give a zero reading by inserting trimmer 29 into either beam 20 or 21 as may be necessary to reduce the overall intensity of said beam, thereby balancing the intensity of the two beams incident upon bolometric resistors 24 and 25. Fine adjustment may be may be varying the individual resistors of the Wheatstone bridge. Hence it can be seen that bolometric resistor 24 receives energy in the .9 to 3.2 micron region of the infra-red spectrum, while bolometric resistor 25 receives energy in the .9 to 3.7 micron region. Now if methane enters chamber 10, a portion of energy having a wave length of approximately 3.4 microns will be absorbed by the methane so as to reduce the intensity of radiation incident upon bolometric resistor 25 which in turn will unbalance the Wheatstone bridge thereby giving an indication of the presence of methane. The more methane present, the greater the radiation absorbed and the greater the unbalancing of the bridge, resulting in both a qualitative and quantitative analysis of the gas mixture with regard to methane.

The arrangement so far described will give accurate results in the absence of other gases having absorption bands in the region being measured. The same is true if other gases are to be present in constant amounts since they will effect both bolometric resistors in like amount after trimmer 21 is adjusted with no methane but with said constant amount of other gases present. However, it often happens that these contaminant gases are present in varying amounts and this tends to introduce error into the readings since the two bolometric resistors are affected by unequal amounts as the composition varies. For example, in a particular industrial application it has been found that carbon dioxide and water vapor often make up as much as 20 per cent of the gas being analyzed for the presence of methane, and it is further known that both these contaminants have absorption bands of wave lengths in the region of 2.5 to 2.8 microns. From Figure 3 it can be seen that with a small amount of said contaminants present the percent transmission of beam 20 through the polyethylene with respect to beam 21 can be represented by the ratio $a/b$ for the 2.5 to 2.8 micron path. Similarly, with a greater concentration of the contaminants present the corresponding per cent transmission can be represented by the ratio $a'/b'$. However, the numerical value of $a$ minus $b$ is always greater than $a'$ minus $b'$ regardless of the amount of contaminant present, even though this difference decreases as the concentration of contaminant increases. Thus more radiation of 2.5 to 2.8 micron wave length will be transmitted through beam 20 containing the polyethylene than through beam 21 when the gas mixture contains a small concentration of the contaminant, and as the contaminant increases this unbalance decreases. With no contaminant the percentage error in the reading may be, say, 10 per cent; with a 15 per cent concentration the error in the reading may be 5 per cent; and with 20 per cent concentration the error of the reading may be down to 1 per cent. It has been discovered that this error may be partially overcome by placing a filter 26 of material such as "vycor" in the paths of both beams 20 and 21 ("vycor" is the trade name of quartz-like material containing predominantly silica glass). "Vycor" has a strong absorption band which overlaps the 2.5 to 2.8 micron band and this has the effect of lowering both curves 35 and 36, bringing them closer to the wave length axis thereby simulating a large concentration of the contaminant. However, there still remains a numerical difference between the two curves as they do not quite coincide. In order to make the curves substantially completely coincide in this region and thereby eliminate the effects resulting from changes in concentration of the contaminant, a filter of fused quartz 28 is likewise placed in beam 20. Fused quartz has a weak absorption characteristic band in the 2.5 to 2.8 micron region, but does absorb sufficient energy to move curve 35 into substantial coincidence with curve 36. This effects a positive correction in the indicator since it lowers the radiation falling on bolometric resistor 24. The positive correction counteracts the effect of the radiation formerly represented by the quantity $a$ minus $b$, thereby making $a$ minus $b$ equal $a'$ minus $b'$ equal zero. Thus the concentration of carbon dioxide and water vapor may increase and decrease but both beams of radiation are affected alike and the contaminant effect is balanced out.

This system therefore provides a correction or balance in each beam for the change in concentration of contaminants where the contaminant predominates in a wave length region which affects both bolometers. Voltage fluctuations across the source are compensated for by means of trimmer 29 as well as primary balance of the Wheatstone bridge being so obtained.

Figure 2:
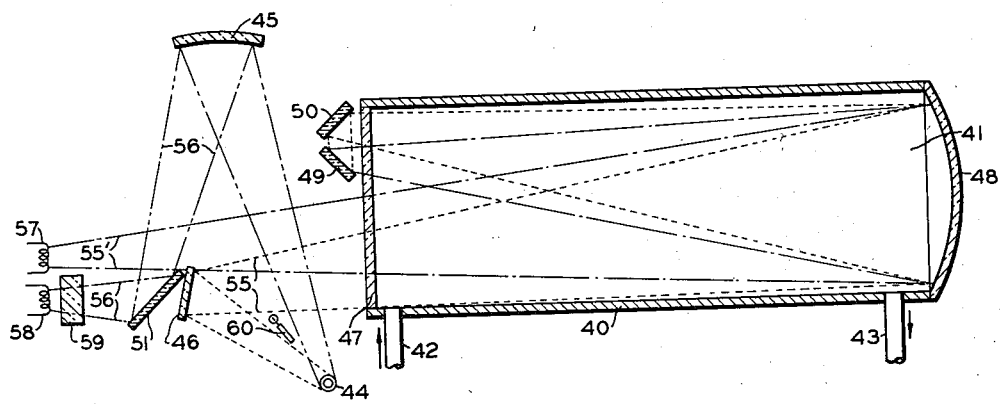
Figure 2 shows an optional arrangement of the analyzer of Figure 1 which may be used for particular mixtures.

If the gaseous mixture being analyzed does not contain any contaminant having absorption bands in the vicinity of the absorption band of the gas being detected, or if all the contaminants have absorption bands that fall at wave lengths which may readily be filtered out of both beams, an optical path such as that shown in Figure 2 may advantageously be employed for low concentration analysis. Radiation from source 44 strikes both concave reflector 45 and plane reflector 46 forming beams 56 and 55, respectively. Beam 55 is reflected through window 47 through interior 41 of chamber 40 to concave reflector 48, from which it is reflected back through chamber 40 and window 47 to plane reflector 50, thence to plane reflector 49, from there back through chamber 40 to reflector 48, and finally said beam emerges from chamber 40 (as beam 55') incident upon bolometric resistor 57. Beam 56 is reflected from plane reflector 51 through filter 59 striking bolometric resistor 58. Filter 59 is constructed of the same material as window 47, which may be fused quartz for methane detection, and is of sufficient thickness to absorb approximately the same intensity of radiation from beam 56 as is absorbed from beam 55 four times transmitted through window 47. Thus with chamber 40 empty, both beams 55' and 56 will strike bolometric resistors 57 and 58 with equal intensity and the Wheatstone bridge will thus be balanced. Any necessary compensating adjustment may be made by means of trimmer 60 or in the Wheatstone bridge circuit itself. The gaseous mixture to be analyzed is then circulated through chamber 40 by means of inlet and outlet conduits 42 and 43, respectively. If the gas being detected is present in chamber 40, beam 55 will be reduced in intensity according to those wave lengths absorbed by said gas in chamber 40. The Wheatstone bridge is thereby unbalanced giving a reading which indicates the quantity of gas present. Transmitting beam 55 through chamber 40 four times is equivalent to increasing the length of said chamber by a factor of four which is of considerable value if the gas being detected is present in small concentration or if said gas has a weak characteristic absorption or both. The disclosed ararngement results in considerable economy of space and material and reduces the amount of gaseous mixture required for a given reading.

While the above description has been set forth in conjunction with a preferred embodiment of this invention, it should be apparent to those skilled in the art that various modifications could be made without departing from the scope of the present invention. For example, any well known source of infra-red radiation which produces wave lengths in the desired range could be used in place of the heated coil, the optical paths are in no way limited to the particular ararngement of reflectors as set forth, other filters having the required absorption characteristics as described herein could be used in place of the preferred filters mentioned, and various other types of temperature sensitive resistances could replace the bolometers.

I claim:

1. Gas detecting apparatus comprising, in combination, two beams of infra-red radiation, means for transmitting both of said beams through a gaseous mixture containing the gas to be detected, a first filter disposed in both of said beams to absorb preselected wave lengths of radiation from both of said beams, a second filter disposed in one of said beams to absorb wave lengths of radiation from said one beam corresponding to the wave lengths absorbed from each of said beams by said gas being detected, a third filter disposed in said one beam to absorb wave lengths of radiation corresponding to the wave lengths partially absorbed from each of said beams by gases present in the mixture being analyzed other than said gas being detected, a fourth filter disposed in both of said beams to absorb wave lengths of radiation corresponding to the wave lengths partially absorbed from each of said beams by gases present in the mixture being analyzed other than said gas being detected, and means for measuring the energies of said resulting beams.

2. Apparatus for detecting the presence of methane in a gaseous mixture containing varying amounts of carbon dioxide and water vapor comprising, in combination, two beams of infra-red radiation, means for transmitting both of said beams through such a gaseous mixture, first filter means disposed in both of said beams to absorb wave lengths of radiation from said beams longer than substantially 3.7 microns and to absorb partially wave lengths of radiation between substantially 2.5 microns and substantially 2.8 microns, said latter absorption region corresponding to radiation absorption bands of both carbon dioxide and water vapor, second filter means disposed in one of said beams to absorb substantially all wave lengths of radiation from said one beam longer than substantially 3.2 microns and to absorb partially wave lengths of radiation between substantially 2.5 microns and substantially 2.8 microns, and means for measuring the energies of said resulting beams.

3. Apparatus for detecting the presence of methane in a gaseous mixture containing varying amounts of carbon dioxide and water vapor comprising, in combination, a source of infra-red radiation, means for separating radiation from said source into two beams, means for transmitting both of said beams through said gaseous mixture, means for transmitting both of said beams through a fused quartz filter and through a "vycor" filter, means for transmitting one of said beams through a polyethylene filter and through a second fused quartz filter, and means for measuring the energies of said resulting beams.

4. Apparatus for detecting the presence of small quantities of methane in a gaseous mixture containing varying amounts of carbon dioxide and water vapor comprising, in combination, a source of infra-red radiation, means for separating radiation from said source into two beams, means for transmitting both of said beams through said gaseous mixture a plurality of times by reflection, means for transmitting both of said beams through a fused quartz filter and through a "vycor" filter, means for transmitting one of said beams through a polyethylene filter and through a second fused quartz filter, and means for measuring the energies of said resulting beams.

5. Apparatus for detecting the presence of methane in a gaseous mixture containing varying amounts of carbon dioxide and water vapor comprising, in combination, a source of infrared radiation, means for separating radiation from said source into two beams, means for transmitting both of said beams through said gaseous mixture a plurality of times by reflection, means for transmitting both of said beams through a filter system adapted to absorb wave lengths from said beams longer than substantially 3.7 microns and to partially absorb wave lengths between substantially 2.5 microns and substantially 2.8 microns, said latter absorption region corresponding to absorption bands of both carbon dioxide and water vapor, means for transmitting one of said beams through a filter system adapted to absorb substantially all wave lengths from said beam longer than substantially 3.2 microns and to partially absorb wave lengths between substantially 2.5 microns and substantially 2.8 microns, and means for measuring the energies of said resulting beams.

References Cited in the file of this patent

UNITED STATES PATENTS

| | | |
|---|---|---|
| 2,212,211 | Pfund | Aug. 20, 1940 |
| 2,314,800 | Pineo | Mar. 23, 1943 |
| 2,545,162 | Muly et al. | Mar. 13, 1951 |

OTHER REFERENCES

Control of Product Quality by Plant-Type Infra-Red Analyzers, by G. A. Martin, Instruments, December 1949, pp. 1102–1105.

Selective Infra-Red Gas Analyzers, by W. G. Fastie et al., Journal of the Optical Society of America, October 1947, pp. 764–765.